United States Patent
Fukushima

(10) Patent No.: US 10,104,295 B2
(45) Date of Patent: Oct. 16, 2018

(54) IMAGE PICKUP APPARATUS AND CONTROL METHOD FOR IMAGE PICKUP APPARATUS WITH DISPLAY OF CROP AREA AND GRID LINES

(71) Applicant: CANON KABUSHIKI KAISHA, Tokyo (JP)

(72) Inventor: Yuki Fukushima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/951,259

(22) Filed: Nov. 24, 2015

(65) Prior Publication Data

US 2016/0156853 A1 Jun. 2, 2016

(30) Foreign Application Priority Data

Nov. 28, 2014 (JP) ................. 2014-241866

(51) Int. Cl.
  *H04N 5/222* (2006.01)
  *H04N 5/232* (2006.01)
  *H04N 5/345* (2011.01)
  *H04N 101/00* (2006.01)

(52) U.S. Cl.
  CPC ..... *H04N 5/23293* (2013.01); *H04N 5/23245* (2013.01); *H04N 5/3454* (2013.01); *H04N 2101/00* (2013.01)

(58) Field of Classification Search
  CPC ........... H04N 5/23293; H04N 2101/00; H04N 5/232; H04N 1/2112; H04N 5/2251; H04N 5/23296; H04N 5/2628; H04N 5/23212
  See application file for complete search history.

(56) References Cited

U.S. PATENT DOCUMENTS

| 6,097,900 | A | * | 8/2000 | Haraguchi | G03B 13/12 396/287 |
| 6,907,194 | B2 | * | 6/2005 | Brost | G03B 13/12 348/240.1 |
| 2005/0088542 | A1 | * | 4/2005 | Stavely | H04N 5/232 348/239 |
| 2011/0050972 | A1 | * | 3/2011 | Ishitsuka | H04N 5/23293 348/333.01 |
| 2013/0222669 | A1 | * | 8/2013 | Irie | H04N 5/23293 348/333.09 |

FOREIGN PATENT DOCUMENTS

| CN | 102629972 A | 8/2012 |
| JP | 5-19333 A | 1/1993 |
| JP | H07-041543 U | 7/1995 |
| JP | H08-022066 A | 1/1996 |
| JP | H08-110565 A | 4/1996 |
| JP | 2012-80428 A | 4/2012 |

\* cited by examiner

*Primary Examiner* — Sinh Tran
*Assistant Examiner* — Selam Gebriel
(74) *Attorney, Agent, or Firm* — Canon U.S.A., Inc. IP Division

(57) ABSTRACT

An image pickup apparatus is capable of displaying a crop area and assist lines in a finder. The assist lines are displayed by one or more segments. A processor performs control to illuminate and to stop illuminating the segments, to display the assist lines only within the crop area while displaying the crop area, when displaying both of the crop area and the assist lines. Further, the processor performs control to illuminate and to stop illuminating the segments, not to display a line in proximity to the crop area among the assist lines.

11 Claims, 9 Drawing Sheets

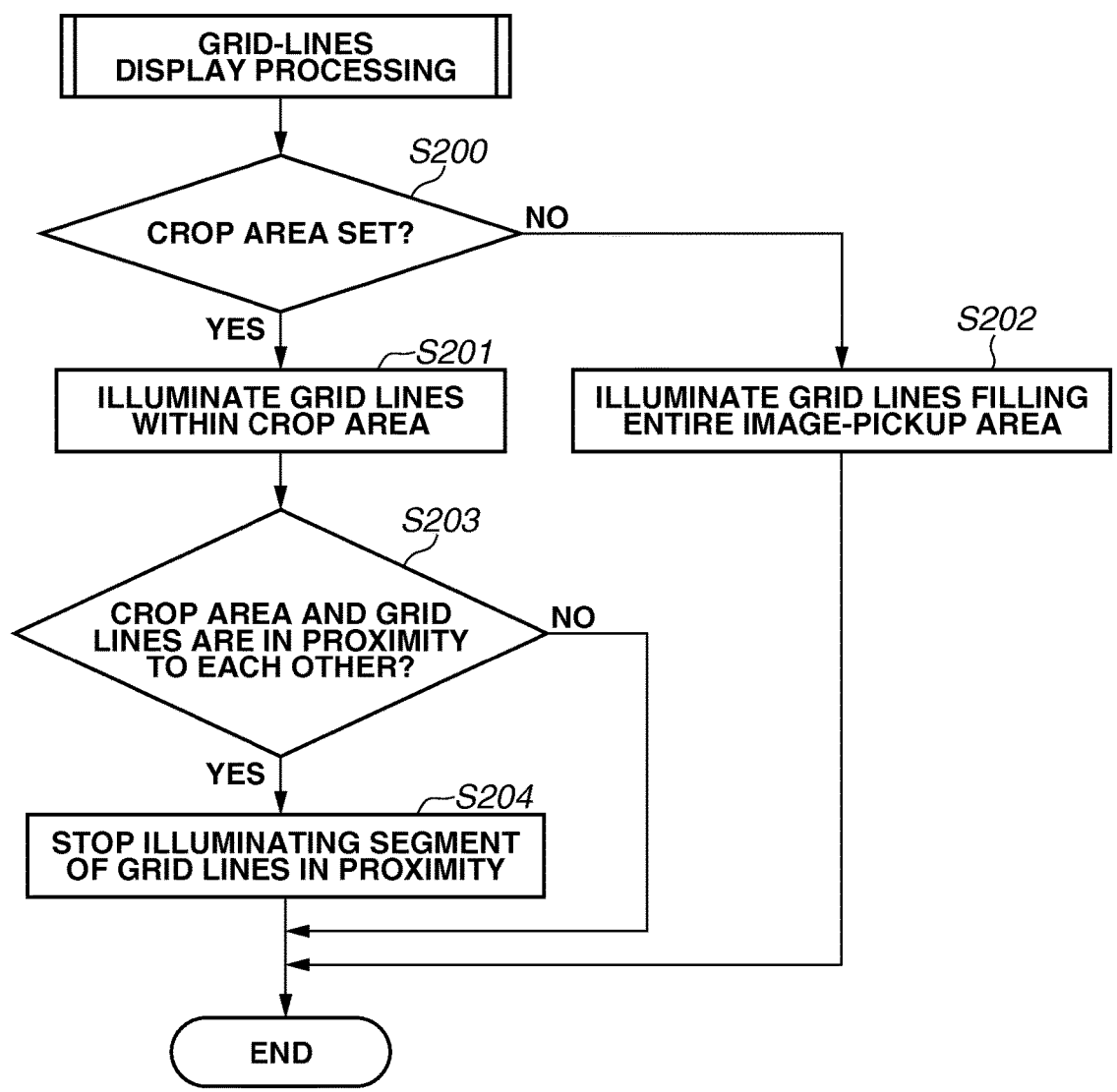

IMAGE PICKUP APPARATUS AND CONTROL METHOD FOR IMAGE PICKUP APPARATUS WITH DISPLAY OF CROP AREA AND GRID LINES

BACKGROUND OF THE INVENTION

Field of the Invention

One disclosed aspect of the embodiments relates to an image pickup apparatus such as an electronic still camera, and a control method for the image pickup apparatus.

Description of the Related Art

In recent years, digital cameras have become higher in pixel density, and models capable of performing crop shooting have been increasingly popular. In the crop shooting, only part of information obtained by an imaging sensor is cut out as a picture. Therefore, a telephoto effect can be obtained with a single lens, and further, a data amount can be reduced. In general, the digital cameras capable of performing the crop shooting are each designed and featured to display a crop area in a finder, and to display a range for capturing an image to a user.

There are documents related to the crop shooting and display of an aspect ratio. For example, Japanese Patent Application Laid-Open No. 5-19333 employs a finder capable of changing the size of a field of view, and discusses a technique for moving a display in the finder according to a change in the field of view. Further, Japanese Patent Application Laid-Open No. 2012-80428, for example, also discusses a related technique. According to this technique, there are selectable modes, namely, a cropping recording mode for recording an image after performing cropping based on a set aspect ratio, and an aspect-ratio addition recording mode for recording a captured image, as well as recording aspect ratio information in a header of the recorded image. In the cropping recording mode, an area, which meets the set aspect ratio, of the captured image is displayed. In the aspect-ratio addition recording mode, a representation of the set aspect ratio is displayed to overlay the captured image.

When a crop area is displayed with a frame, and grid lines overlaid on the crop area are displayed in a liquid crystal display, the grid lines extend off the crop area. Therefore, it is difficult to recognize the crop area. Even if the display in the finder is moved as discussed above, it is still difficult to recognize the crop area, as long as the grid lines remain displayed in the state of extending off the crop area. Moreover, even if determination is made as to whether to switch the display according to the recording mode, the problem remains unsolved, as long as it is difficult to recognize the crop area before shooting.

SUMMARY OF THE INVENTION

One disclosed aspect of the embodiments is directed to allowing both of a crop area and assist lines to be clearly displayed.

According to an aspect of the disclosure, an image pickup apparatus is capable of causing a display device to display a crop area, and assist lines different from the crop area, and the image pickup apparatus includes a control unit configured to perform control to illuminate and to stop illuminating a segment among a plurality of segments for displaying the assist lines, to display the assist lines only within the crop area while displaying the crop area, when displaying both of the crop area and the assist lines.

Further features of the disclosure will become apparent from the following description of exemplary embodiments with reference to the attached drawings.

BRIEF DESCRIPTION OF THE DRAWINGS

FIG. 4 is a flowchart illustrating details of grid-lines display processing in FIG. 3.

DESCRIPTION OF THE EMBODIMENTS

A suitable exemplary embodiment will be described below, with reference to the attached drawings.

Figure 1:
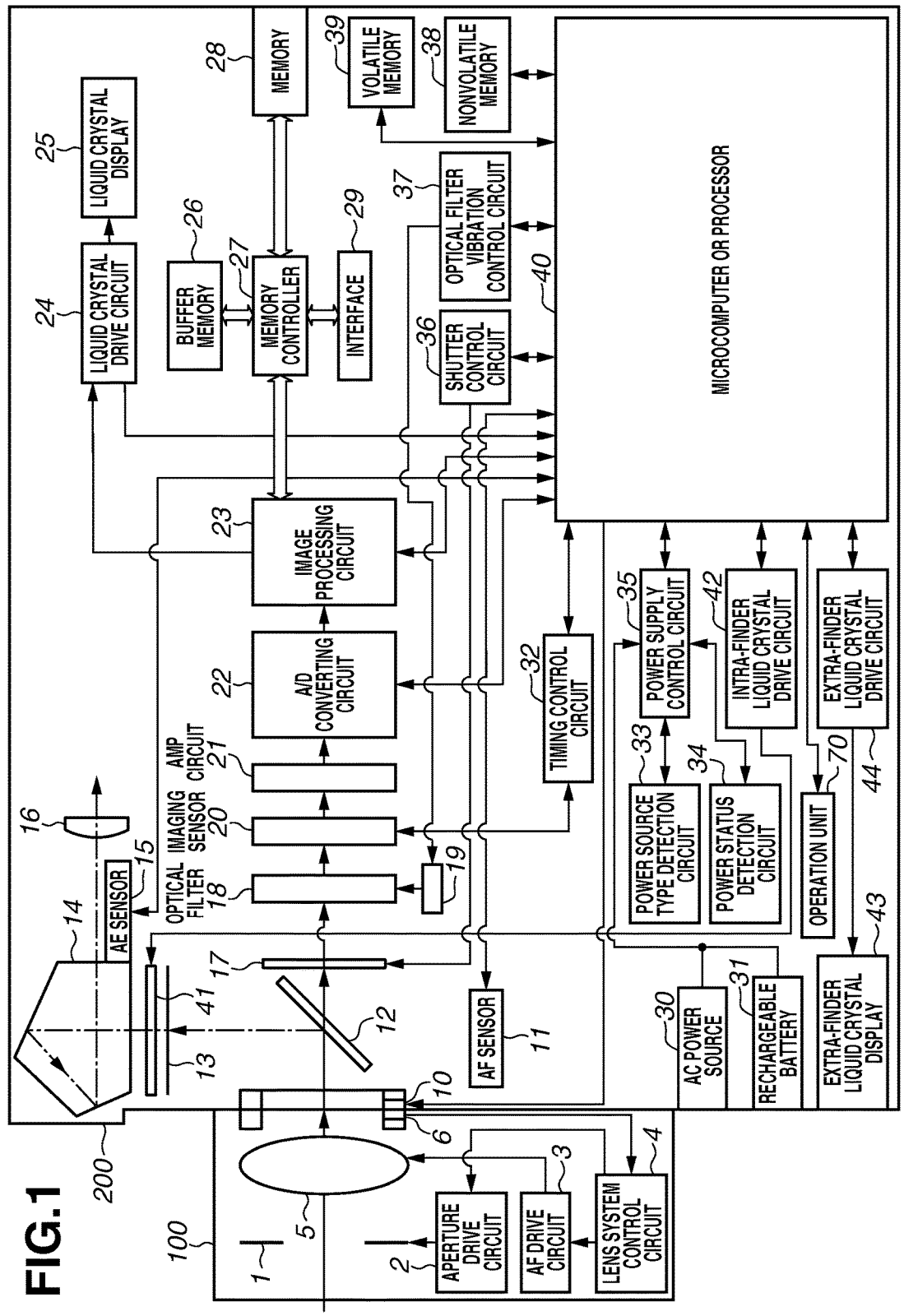
FIG. 1 is a block diagram illustrating a configuration of a digital camera according to an exemplary embodiment.

FIG. 1 is a block diagram illustrating a configuration of a digital camera that is an image pickup apparatus according to the exemplary embodiment. A lens unit 100 is attached to a digital camera 200. In the present exemplary embodiment, a configuration in which the lens unit 100 is detachably attachable will be described. However, a configuration in which a digital camera and a lens are integral with each other may be employed.

In the lens unit 100, a lens 5 is usually configured of one or more lenses, but is represented here simply by only one lens.

A communication terminal 6 is provided for allowing the lens unit 100 to communicate with the digital camera 200. A communication terminal 10 is provided for allowing the digital camera 200 to communicate with the lens unit 100. The lens unit 100 communicates with a microcomputer 40 of the digital camera 200, via the communication terminals 6 and 10. By this communication, a lens system control circuit 4 provided inside the lens unit 100 controls an iris diaphragm 1 via an aperture drive circuit 2, and displaces the position of the lens 5 via an autofocus (AF) drive circuit 3, thereby achieving focus. The microcomputer 40 acquires a full aperture value and a minimum aperture value of the lens unit 100, via the communication terminals 6 and 10.

In the digital camera 200, the microcomputer or a processor 40 controls each part of the digital camera 200. The microcomputer or the processor 40 loads and executes a program recorded in a nonvolatile memory 38, by using a volatile memory 39 serving as a working memory, thereby executing various kinds of processing to be described below.

An auto exposure (AE) sensor 15 measures luminance of a subject, based on light passing through the lens unit 100.

An auto focus (AF) sensor 11 outputs defocus-amount information, to the microcomputer or processor 40. The microcomputer 40 controls the lens unit 100, based on the received defocus-amount information.

A quick-return mirror 12 is directed upward or downward by an actuator (not illustrated) at the time of exposure, according to an instruction from the microcomputer 40. A photographer can check the focus and a composition of a subject optical image obtained via the lens unit 100, by viewing a focusing screen 13 via a pentaprism 14 and a finder 16.

A focal plane shutter 17 can freely control an exposure time of an imaging sensor 20, under control of the microcomputer 40. The microcomputer 40 controls the focal plane shutter 17 via a shutter control circuit 36.

An optical filter 18 generally includes a low-pass filter. The optical filter 18 removes a high-frequency component of light entering through the focal plane shutter 17, to guide the light representing a subject image to the imaging sensor 20.

For the imaging sensor 20, a charge coupled device (CCD), a complementary metal oxide semiconductor (CMOS), or the like is used in general. The imaging sensor 20 photoelectrically converts a subject image formed on the imaging sensor 20 through the lens unit 100, and captures this subject image as an electrical signal. The microcomputer 40 controls timing for driving the imaging sensor 20 via a timing control circuit 32.

For the captured electrical signal, an amplifier (AMP) circuit 21 performs shooting-signal amplification with a gain according to shooting sensitivity being set.

An analog-to-digital (A/D) converting circuit 22 converts an analog signal, which is the electrical signal resulting from the conversion by the imaging sensor 20, into a digital signal.

An image processing circuit 23 performs filter processing, color conversion processing, and gamma/knee processing, on image data corresponding to the digital signal resulting from the conversion by the A/D converting circuit 22, and outputs a result to a memory controller 27. Further, the image processing circuit 23 has a built-in digital-to-analog (D/A) converting circuit that converts the image data corresponding to the digital signal resulting from the conversion by the A/D converting circuit 22, or image data input by the memory controller 27, into an analog signal. The image processing circuit 23 then outputs the analog signal to a liquid crystal display 25, via a liquid crystal drive circuit 24. Such image processing and display processing by the image processing circuit 23 are changed by the microcomputer 40. Further, the microcomputer 40 performs white balance adjustment, based on color balance information of the captured image. The liquid crystal display 25 is a rear monitor for displaying an image. The liquid crystal display 25 is not limited to the liquid crystal type, and may be a display of other type such as organic electroluminescence (EL), if the display displays an image.

The memory controller 27 stores yet-to-be-processed image data input from the image processing circuit 23 into a buffer memory 26, and stores processed image data into a recording medium 28. Conversely, the memory controller 27 acquires image data from the buffer memory 26 and the recording medium 28, and outputs the acquired image data to the image processing circuit 23. Further, the memory controller 27 stores image data sent via an external interface 29 into the recording medium 28, and, conversely, outputs image data stored in the recording medium 28 to the outside via the external interface 29. Examples of the external interface 29 include interfaces compliant with Universal Serial Bus (USB), the Institute of Electrical and Electronics Engineers (IEEE), and High-Definition Multimedia Interface (HDMI, registered trademark). The recording medium 28 is a detachable recording medium such as a memory card. However, a built-in memory may be employed.

A power supply control circuit 35 controls supply of power from an alternating current (AC) power source 30 or a rechargeable battery 31. The power supply control circuit 35 turns on/off the power supply, by receiving an instruction from the microcomputer 40. Further, the power supply control circuit 35 notifies the microcomputer 40 of information about the current power status detected by a power status detection circuit 34, and information about the current power source type detected by a power source type detection circuit 33.

An optical filter vibration control circuit 37 causes a piezoelectric element 19 connected to the optical filter 18 to vibrate. The microcomputer 40 provides an instruction for causing the piezoelectric element 19 to vibrate, based on a predetermined value representing each of an amplitude of vibration, a vibration time, and an axial direction of vibration.

The nonvolatile memory 38 can save setting values such as a shutter speed, an aperture value, and shooting sensitivity freely set by a user, as well as other various kinds of data, even in a state where the image pickup apparatus is powered off.

The volatile memory 39 saves data desired to be stored temporarily, such as an internal status of the image pickup apparatus, and information about the recording medium 28 that is detachable.

An intra-finder liquid crystal display 41 displays a frame indicating a distance measurement point at which autofocus is currently performed, a crop mask, a frame indicating a crop area, grid lines (assist lines), and the like, via an intra-finder liquid crystal drive circuit 42.

An extra-finder liquid crystal display 43 displays various setting values of the digital camera 200 such as a shutter speed and an aperture, via an extra-finder liquid crystal drive circuit 44.

An operation unit 70 is a group of various operation members each serving as an input section for receiving operation from the user. Specifically, the operation unit 70 includes various operation members illustrated in FIGS. 2A and 2B to be described below.

Figure 2A:
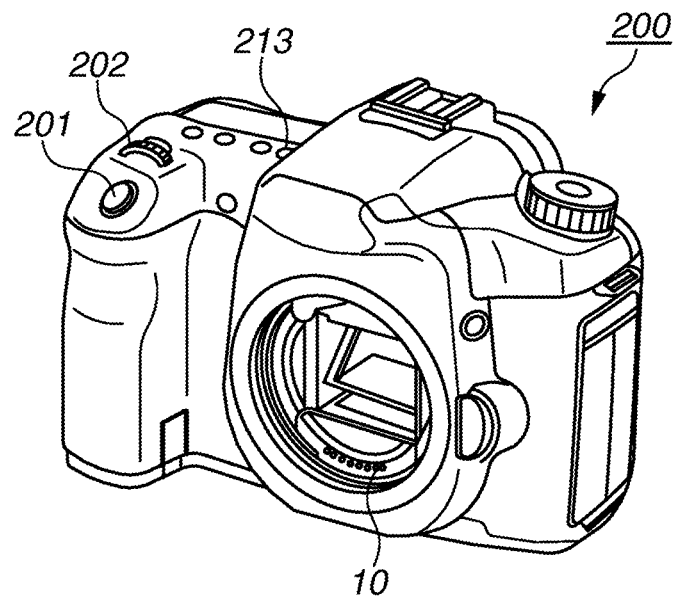
FIGS. 2A and 2B are diagrams each illustrating an appearance of the digital camera according to the exemplary embodiment.
Figure 2B:
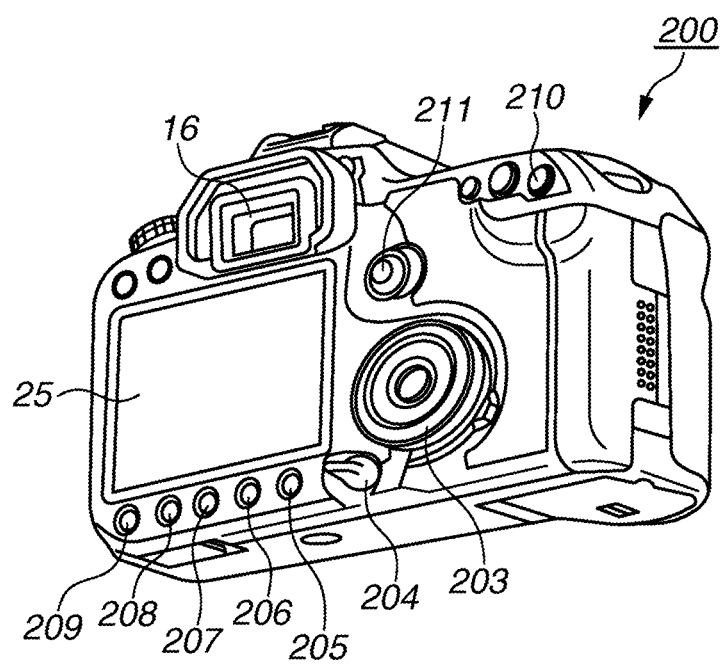

FIG. 2A is a diagram illustrating an appearance of the digital camera 200 when viewed from front, and FIG. 2B is a diagram illustrating an appearance of the digital camera 200 when viewed from back. Elements common to the elements in FIG. 1 are provided with the same reference numerals as the reference numerals of the elements in FIG. 1.

A release button 201 is an operation member for providing a shooting preparation instruction and an image shooting instruction. A half press of the release button 201 causes luminance measurement and focusing of a subject. Further, a full press of the release button 201 causes shutter release, so that an image is captured.

An electronic main dial 202 is a rotation operation member. The user determines setting values such as a shutter speed and an aperture, or makes a fine adjustment to a magnifying factor in an enlargement mode, by rotating the electronic main dial 202.

An electronic sub-dial 203 is a rotation operation member. The user determines setting values for an aperture, exposure compensation, and the like, or performs operation for scrolling images forward one by one in an image display state, by rotating the electronic sub-dial 203.

A power switch 204 is an operation member for power-on and power-off.

A protection button 205 is an operation member for performing processing such as protection and rating, for images stored in the recording media provided inside and outside the image pickup apparatus.

A menu button 206 is an operation member for causing the liquid crystal display 25 to display various setting screens.

A deletion button 207 is an operation member for providing an instruction for deleting an image, among the images stored in the recording media provided inside and outside the image pickup apparatus.

An enlargement mode button 208 is an operation member for providing an instruction for a transition to the enlargement mode (an enlargement-mode start instruction), and an instruction for exiting the enlargement mode (an enlargement-mode termination instruction), in a playback state.

A playback instruction button 209 is an operation member for causing the liquid crystal display 25 to display an image among the images stored in the recording media provided inside and outside the image pickup apparatus.

A distance measurement point selection button 210 is an operation member for entering a mode of selecting a distance measurement point that is an autofocus starting point.

A multi-controller 211 is an operation member operable in one or more directions. The multi-controller 211 is provided to set a distance measurement point that is an autofocus starting point, and to move an enlargement frame (an area being enlarged) in an enlarged-image display state.

A white balance (WB)/photometry mode selection button 213 is an operation member for entering a mode for selecting a WB mode and a photometry mode. When the image pickup apparatus is in this mode, the user changes the photometry mode by operating the electronic main dial 202, and changes the WB mode by operating the electronic sub-dial 203.

A display scheme when the crop area and the grid lines (the assist lines) are set will be described below. In the present exemplary embodiment, the display will be described in three cases, i.e., a case where no crop area is set, a case where the crop area is of Advanced Photo System type-H (APS-H) size, and a case where the crop area is of APS-C size.

Figure 3:
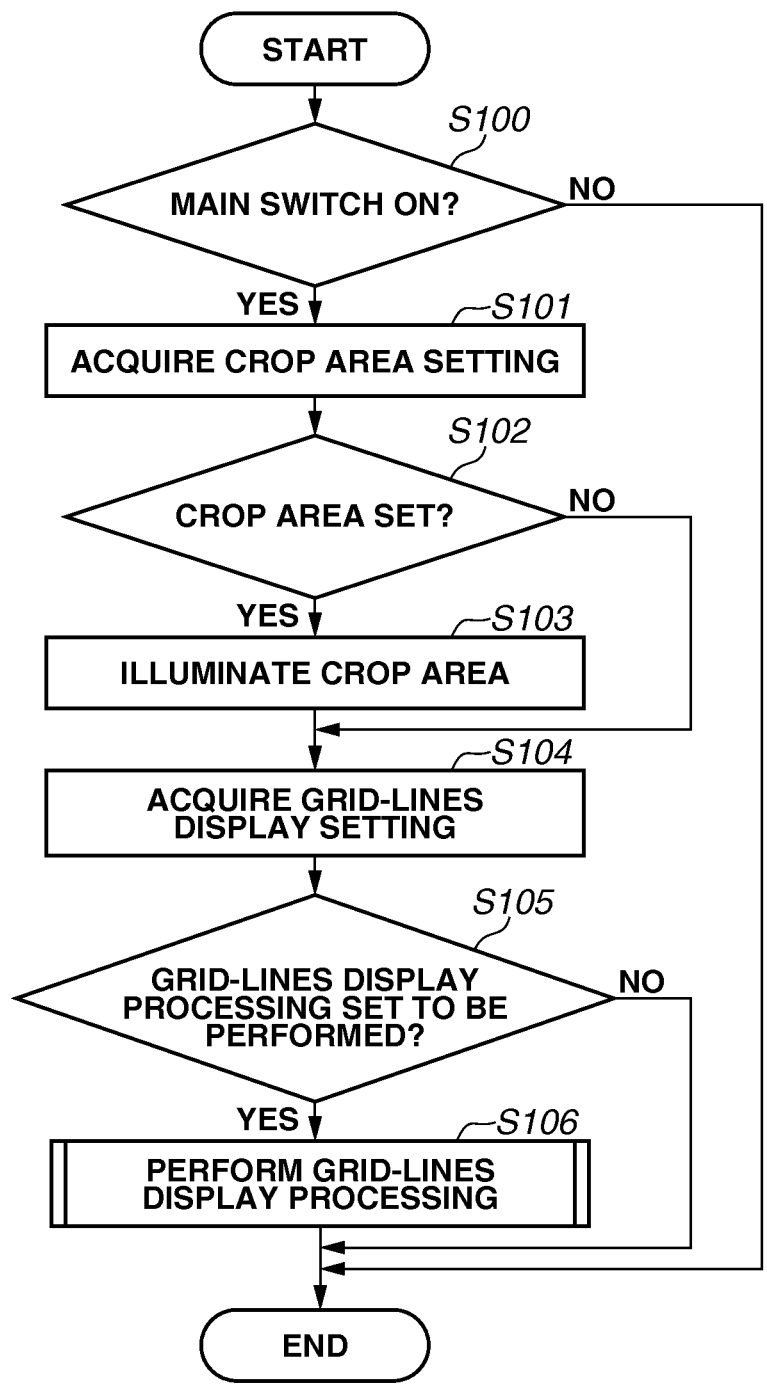
FIG. 3 is a flowchart illustrating processing operation of the digital camera according to the exemplary embodiment.

FIG. 3 is a flowchart illustrating processing operation of the digital camera 200 according to the exemplary embodiment.

In step S100, the microcomputer 40 determines whether the power switch 204 is ON. If the power switch 204 is ON (YES in step S100), the operation proceeds to step S101. If the power switch 204 is not ON (NO in step S100), this processing terminates.

Figure 5B:
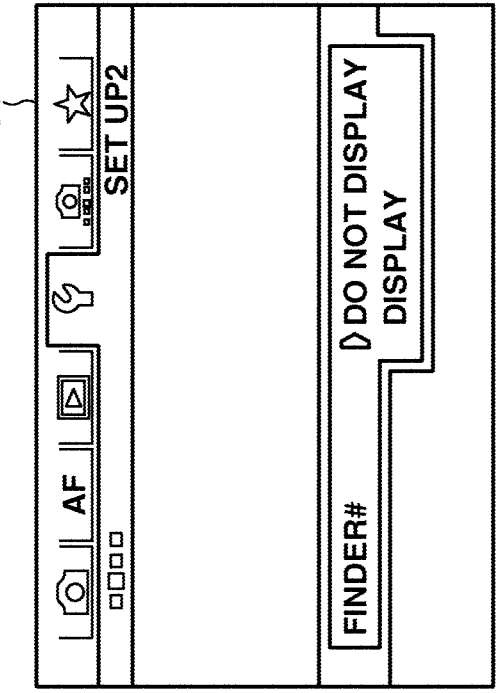
FIGS. 5A and 5B are diagrams each illustrating an example of a graphical user interface (GUI) screen.
Figure 5A:
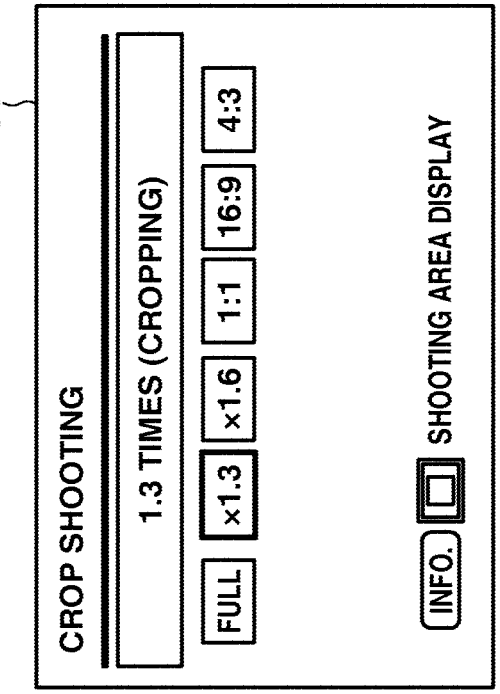

In step S101, the microcomputer 40 acquires a crop area setting (a setting value of a crop area) set in the nonvolatile memory 38. The user can set the crop area on a graphical user interface (GUI) screen 501 illustrated in FIG. 5A, and save this setting in the nonvolatile memory 38.

In step S102, the microcomputer 40 determines whether the crop area is set, based on the crop area setting acquired in step S101. If the crop area is set (YES in step S102), the operation proceeds to step S103. If the crop area is not set (NO in step S102), the operation proceeds to step S104.

Figure 6A:
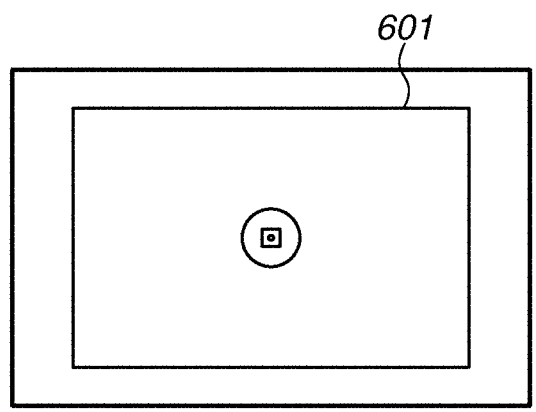
FIGS. 6A and 6B are diagrams each illustrating a display example of a crop area in a finder.
Figure 6B:
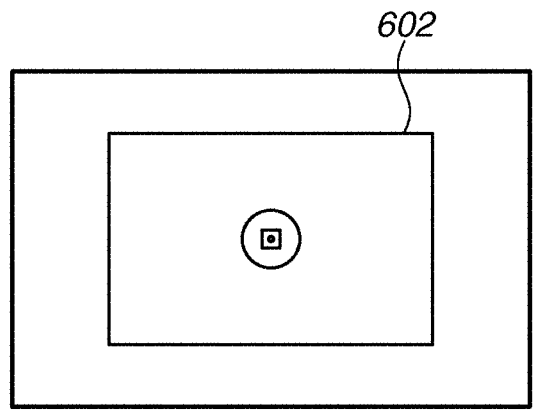
Figure 9A:
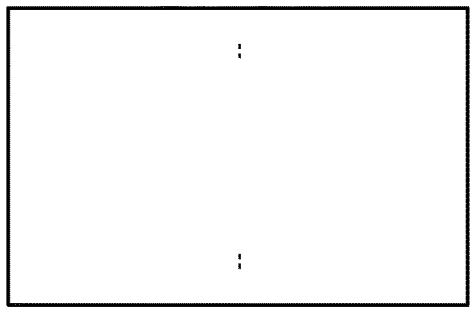
FIGS. 9A to 9G are diagrams each illustrating a segment.
Figure 9B:
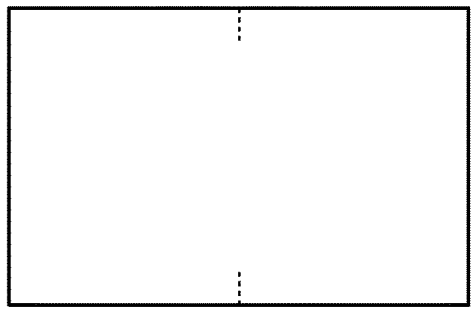
Figure 9C:
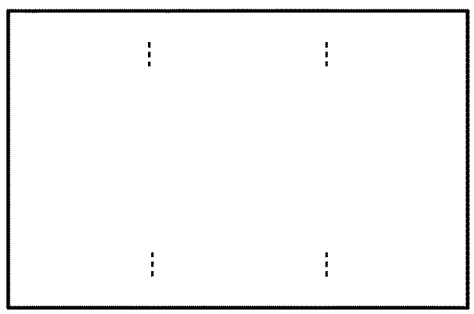
Figure 9D:
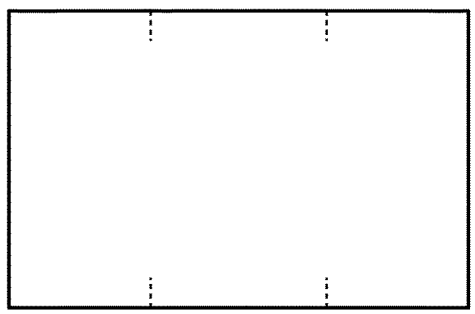
Figure 9E:
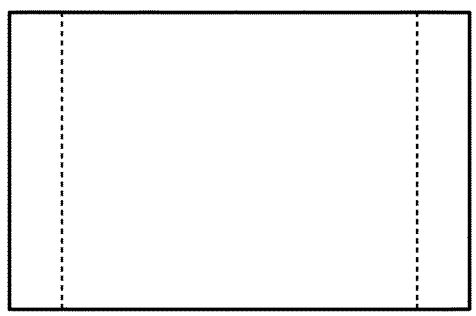
Figure 9F:
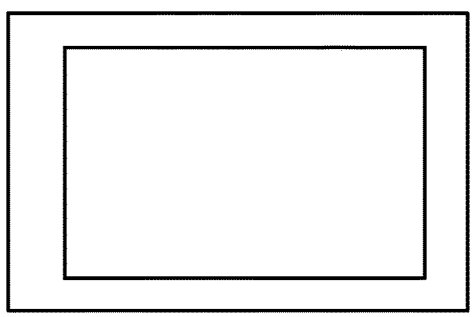
Figure 9G:
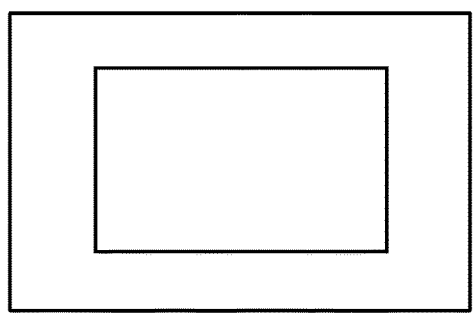

In step S103, the microcomputer 40 controls the intra-finder liquid crystal drive circuit 42, to display the crop area. If the crop area setting acquired in step S101 corresponds to APSH, the crop area of APSH is displayed with a frame 601 as illustrated in FIG. 6A, within the finder 16. FIG. 9F illustrates a segment for displaying the frame of the crop area of the APSH size. If the crop area setting acquired in step S101 corresponds to APSC, the crop area of APSC is displayed with a frame 602 as illustrated in FIG. 6B, within the finder 16. FIG. 9G illustrates a segment for displaying the frame of the crop area of the APSC size.

In step S104, the microcomputer 40 acquires a grid-lines display setting (a setting value of grid-lines display) set in the nonvolatile memory 38. The setting value of grid-lines display is a setting value used to set whether to display the grid lines within the finder 16. The user can make the grid-lines display setting on a GUI screen 502 illustrated in FIG. 5B, and save this setting in the nonvolatile memory 38.

In step S105, the microcomputer 40 determines whether the grid-lines display setting acquired in step S104 indicates display of the grid lines. If the display of the grid lines is indicated (YES in step S105), the operation proceeds to step S106. If the display of the grid lines is not indicated (NO in step S105), this processing terminates.

In step S106, the microcomputer 40 performs grid-lines display processing. This grid-lines display processing will be described below in detail, by using FIG. 4.

Next, the grid-lines display processing in step S106 will be described.

FIG. 4 is a flowchart illustrating details of the grid-lines display processing in step S106.

In step S200, the microcomputer 40 determines whether the crop area is set, based on the crop area setting acquired in step S101. If the crop area is set (YES in step S200), the operation proceeds to step S201. If the crop area is not set (NO in step S200), the operation proceeds to step S202.

In step S201, the microcomputer 40 controls the intra-finder liquid crystal drive circuit 42, to display the grid lines only within the set crop area.

Here, FIGS. 8A to 8F and FIGS. 9A to 9E each illustrate a layout of a segment for displaying the grid lines.

Figure 7A:
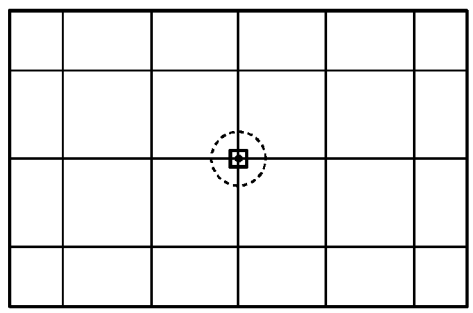
FIGS. 7A to 7D are diagrams each illustrating a display example of a crop area and grid lines in the finder.
Figure 7B:
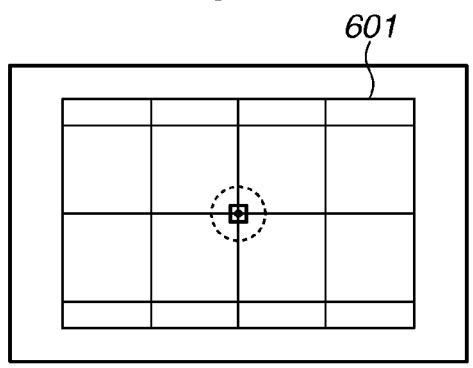

FIG. 7B illustrates a display example when the crop area setting acquired in step S101 corresponds to APSH. The microcomputer 40 controls the intra-finder liquid crystal drive circuit 42, to display the grid lines, so that the segment in each of FIGS. 8A, 8B, 8D, 8E, 9A, 9C, and 9F is illuminated.

Figure 7C:
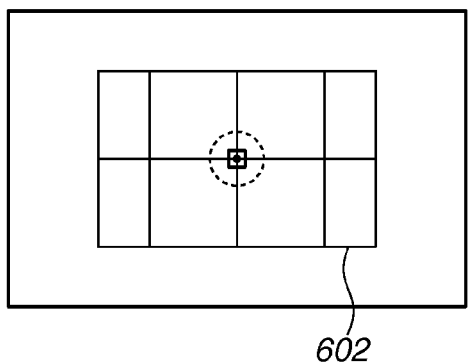
Figure 7D:
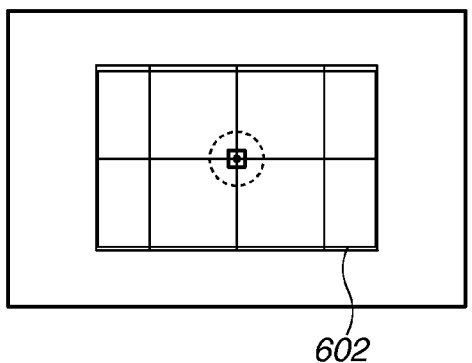
Figure 8A:
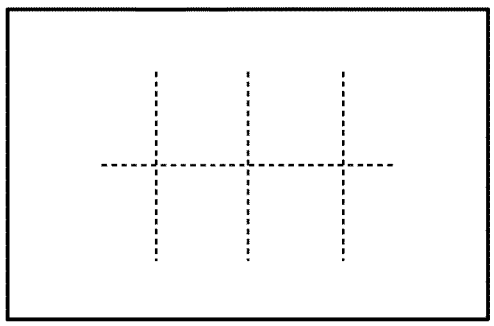
FIGS. 8A to 8F are diagrams each illustrating a segment.
Figure 8B:
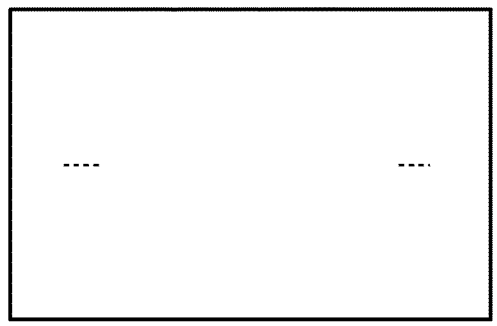
Figure 8C:
Figure 8D:
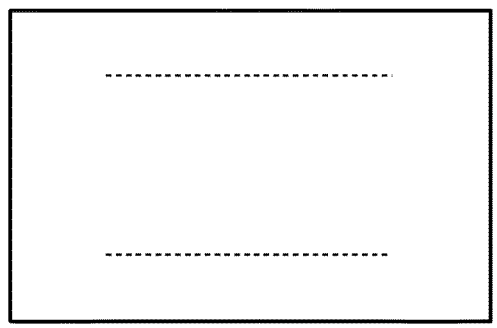
Figure 8E:
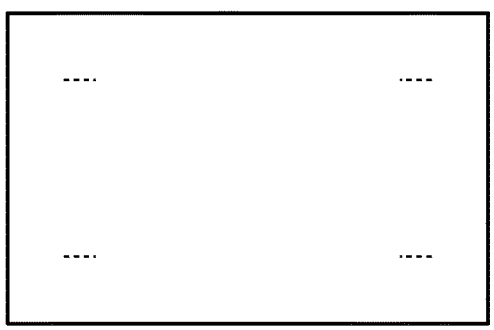
Figure 8F:

Further, FIG. 7D illustrates a display example when the crop area setting acquired in step S101 corresponds to APSC. The microcomputer 40 controls the intra-finder liquid crystal drive circuit 42, to display the grid lines, so that the segment in each of FIGS. 8A, 8D, and 9G is illuminated. Here, in the display example of FIG. 7D, the frame of the crop area and the grid lines are in proximity to each other, and thus are difficult to see.

In step S202, the microcomputer 40 controls the intra-finder liquid crystal drive circuit 42, to display the grid lines filling the entire image-pickup area.

FIG. 7A illustrates an example of displaying the grid lines filling the entire image-pickup area. The microcomputer 40 controls the intra-finder liquid crystal drive circuit 42, to illuminate all the segments necessary for displaying the grid lines in this example, namely, the segment in each of FIGS. 8A, 8B, 8C, 8D, 8E, and 8F as well as FIGS. 9A, 9B, 9C, 9D, and 9E.

In step S203, the microcomputer 40 determines whether the frame of the crop area indicated by the setting acquired in step S101 and the grid lines are in proximity to each other. If the frame of the crop area and the grid lines are in proximity to each other (YES in step S203), the operation proceeds to step S204. If not (NO in step S203), this processing terminates.

In step S204, the microcomputer 40 controls the intra-finder liquid crystal drive circuit 42, to stop illuminating the segment of the grid lines in proximity to the frame of the crop area. As illustrated in FIG. 7D, in a state where the frame of the crop area and the grid lines are in proximity to each other, the microcomputer 40 controls the intra-finder liquid crystal drive circuit 42, to stop illuminating the segment illustrated in FIG. 8D. As a result, as illustrated in FIG. 7C, the segment of the grid lines in proximity to the frame of the crop area is removed. In other words, lines in proximity to the crop area among the grid lines are not displayed. Therefore, both the crop area and the grid lines are clearly displayed.

The control described with reference to FIGS. 3 and 4 may be performed by a single piece of hardware, or may be performed by two or more pieces of hardware, so that the entire apparatus is controlled.

The preferable exemplary embodiment is described above, but the disclosure is not limited to this specific exemplary embodiment, and includes various forms in the scope not deviating from the gist of the disclosure. Further, the above-described exemplary embodiment only represents one exemplary embodiment of the disclosure, and parts of the exemplary embodiments may be combined as appropriate.

In the above-described exemplary embodiment, the case where the disclosure is applied to the digital camera is described as an example. However, the disclosure is not limited to this example, and is applicable to any type of image pickup apparatus if the image pickup apparatus allows a display device to display the crop area and the grid lines.

According to the disclosure, both the crop area and the grid lines (the assist lines) can be clearly displayed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2014-241866, filed Nov. 28, 2014, which is hereby incorporated by reference herein in its entirety.

What is claimed is:

1. An image pickup apparatus comprising:
   an optical finder;
   a first display segment placed on an optical path in the optical finder, the first display segment being a display segment for displaying a first crop area and having a frame shape;
   a second display segment placed on the optical path, the second display segment being a display segment for displaying a grid line and having a shape with a plurality of lines that intersect one another and located inside the first display segment;
   a third display segment placed on the optical path, the third display segment being a line-shaped display segment for displaying a grid line and located outside the second display segment, wherein in a state where the second display segment and the third display segment are simultaneously displayed, the lines included in the second display segment and the lines included in third display segment are visually recognized as lines in same straight lines; and
   a memory and at least one processor which function as:
       a setting unit configured to set a crop area;
       a control unit configured to perform control
           in a case where the first crop area is not set by the setting unit, to display both of the second display segment and the third display segment without displaying the first display segment, and
           in a case where the first crop area is set by the setting unit, to display the first display segment and the second display segment without displaying the third display segment.

2. The image pickup apparatus according to claim 1, further comprising:
   a fourth display segment placed on the optical path in the optical finder, the fourth display segment being a display segment for displaying a second crop area larger than the first crop area and having a frame shape; and
   a fifth display segment placed on the optical path, the fifth display segment being a line-shaped display segment for displaying a grid line and located outside the fourth display segment, wherein in a state where the third display segment and the fifth display segment are simultaneously displayed, the third display segment and the fifth display segment are visually recognized as lines in same straight lines,
   wherein the control unit is further configured to perform control
       in a case where any crop area is not set by the setting unit, to display the second display segment, the third display segment and the fifth display segment without displaying the fourth display segment, and
       in a case where the second crop area is set by the setting unit, to display the second display segment and the third display segment without displaying the fifth display segment.

3. The image pickup apparatus according to claim 2, wherein the third display segment is located inside the fourth display segment.

4. The image pickup apparatus according to claim 1, further comprising:
   a sixth display segment placed on the optical path in the optical finder, the six display segment being a line-shaped display segment for displaying a grid line and located inside the first display segment, wherein the control unit is further configured to perform control
in a case where the first crop area is not set by the setting unit, to display the second display segment, the third display segment and the sixth display segment without displaying the first display segment, and
in a case where the first crop area is set by the setting unit, to display the second display segment and the first display segment without displaying the third display segment and the sixth display segment.

5. The image pickup apparatus according to claim 4, wherein the sixth display segment is a line parallel to the third display segment.

6. The image pickup apparatus according to claim 4, wherein the sixth display segment is a line in proximity to first display segment.

7. The image pickup apparatus according to claim 1, wherein the first display segment displays a crop area in APS-C size.

8. The image pickup apparatus according to claim 2, wherein the fourth display segment displays a crop area in APS-H size.

9. A control method of an image pickup apparatus including
an optical finder,
a first display segment placed on an optical path in the optical finder, the first display segment being a display segment for displaying a first crop area and having a frame shape,
a second display segment placed on the optical path, the second display segment being a display segment for displaying a grid line and having a shape with a plurality of lines that intersect one another and located inside the first display segment,
a third display segment placed on the optical path, the third display segment being a line-shaped display segment for displaying a grid line and located outside the second display segment, wherein in a state where the second display segment and the third display segment are simultaneously displayed, the lines included in the second display segment and the lines included in third display segment are visually recognized as lines in same straight lines,
the method comprising:
setting a crop area;
performing control
in a case where the first crop area is not set, to display both of the second display segment and the third display segment without displaying the first display segment, and
in a case where the first crop area is set, to display the first display segment and the second display segment without displaying the third display segment.

10. A method for controlling an imaging apparatus having an optical finder,
a first display segment placed on an optical path in the optical finder, the first display segment being a display segment for displaying a first crop area and having a frame shape,
a second display segment placed on the optical path, the second display segment being a display segment for displaying a grid line and having a shape with a plurality of lines that intersect one another and located inside the first display segment, and
a third display segment placed on the optical path, the third display segment being a line-shaped display segment for displaying a grid line and located outside the second display segment, wherein in a state where the second display segment and the third display segment are simultaneously displayed, the lines included in the second display segment and the lines included in third display segment are visually recognized as lines in same straight lines,
the method comprising:
setting a crop area;
performing control
in a case where the first crop area is not set, to display both of the second display segment and the third display segment without displaying the first display segment, and
in a case where the first crop area is set, to display the first display segment and the second display segment without displaying the third display segment.

11. A non-transitory storage medium for an image pickup apparatus that comprises:
an optical finder;
a first display segment placed on an optical path in the optical finder, the first display segment being a display segment for displaying a first crop area and having a frame shape;
a second display segment placed on the optical path, the second display segment being a display segment for displaying a grid line and having a shape with a plurality of lines that intersect one another and located inside the first display segment; and
a third display segment placed on the optical path, the third display segment being a line-shaped display segment for displaying a grid line and located outside the second display segment, wherein in a state where the second display segment and the third display segment are simultaneously displayed, the lines included in the second display segment and the lines included in third display segment are visually recognized as lines in same straight lines;
the non-transitory storage medium storing instructions that, when executed by a processor, cause the processor to perform operations comprising:
setting a crop area;
performing control
in a case where the first crop area is not set, to display both of the second display segment and the third display segment without displaying the first display segment, and
in a case where the first crop area is set, to display the first display segment and the second display segment without displaying the third display segment.

* * * * *